(12) United States Patent
Meng et al.

(10) Patent No.: US 11,860,501 B2
(45) Date of Patent: Jan. 2, 2024

(54) OPTICAL SWITCH AND CONTROL METHOD THEREOF, AND DISPLAY APPARATUS

(71) Applicant: BOE TECHNOLOGY GROUP CO., LTD., Beijing (CN)

(72) Inventors: Xianqin Meng, Beijing (CN); Xiandong Meng, Beijing (CN); Wei Wang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 689 days.

(21) Appl. No.: 16/971,400

(22) PCT Filed: Nov. 29, 2019

(86) PCT No.: PCT/CN2019/122185
§ 371 (c)(1),
(2) Date: Aug. 20, 2020

(87) PCT Pub. No.: WO2021/103000
PCT Pub. Date: Jun. 3, 2021

(65) Prior Publication Data
US 2021/0325755 A1    Oct. 21, 2021

(51) Int. Cl.
*G02F 1/166* (2019.01)
*G02F 1/1676* (2019.01)
(Continued)

(52) U.S. Cl.
CPC ............ *G02F 1/166* (2019.01); *G02F 1/1676* (2019.01); *G02F 1/1677* (2019.01);
(Continued)

(58) Field of Classification Search
CPC .. G02F 1/167; G02F 1/134309; G02F 1/1333; G02F 1/13306; G02F 1/133377;
(Continued)

(56) References Cited

U.S. PATENT DOCUMENTS

2006/0132927 A1   6/2006   Yoon
2007/0188676 A1   8/2007   Choi et al.
(Continued)

FOREIGN PATENT DOCUMENTS

CN   101504486 A   8/2009
CN   101520565 A   9/2009
(Continued)

OTHER PUBLICATIONS

Extended European Search Report dated Nov. 17, 2022 issued in the corresponding European Patent Application No. 19948864.4.

*Primary Examiner* — Brandi N Thomas
(74) *Attorney, Agent, or Firm* — McDermott Will & Emery LLP

(57) ABSTRACT

An optical switch includes a plurality of micro-grooves, a micro-fluid disposed in each micro-groove of the plurality of micro-grooves, and a driving electrode disposed corresponding to the micro-fluid in each micro-groove. The driving electrode is configured to provide a voltage to a corresponding micro-fluid to control light transmittance of a region where the micro-fluid is located.

11 Claims, 11 Drawing Sheets

(51) Int. Cl.
  *G02F 1/16757* (2019.01)
  *G02F 1/1677* (2019.01)
  *G09G 3/34* (2006.01)
  *G02B 27/01* (2006.01)

(52) U.S. Cl.
  CPC ......... *G02F 1/16757* (2019.01); *G09G 3/348* (2013.01); *G02B 27/0172* (2013.01)

(58) Field of Classification Search
  CPC .... G02F 1/1676; G02F 1/1677; G02F 1/1679; G02F 1/133; G02F 1/133305; G02F 1/1337; G02F 1/133723; G02F 1/1393; G02F 1/1675; G02F 1/16755; G02F 1/1681; G02F 1/1685; G02F 2202/36; G02F 1/1303; G02F 1/133342; G02F 1/13338; G02F 1/1334; G02F 1/133504; G02F 1/133512; G02F 1/133514; G02F 1/133528; G02F 1/133553; G02F 1/133711; G02F 1/133738; G02F 1/133765; G02F 1/1341; G02F 1/134363; G02F 1/13439; G02F 1/13452; G02F 1/13475; G02F 2201/12; G02F 2202/023; G09G 2300/08; G09G 2300/0895; G09G 2310/027; G09G 2310/0297; G09G 3/20; G09G 3/30; G09G 3/3208; G09G 3/36; G09G 3/3648; G09G 3/3655; G09G 3/3688; G09G 5/001; H10K 59/12; H10K 59/1216; H10K 59/123; H10K 59/131; H10K 2102/311; H10K 50/826; H10K 50/84; H10K 50/841; H10K 50/8423; H10K 50/8426; H10K 50/844; H10K 50/865; H10K 59/128; H10K 59/40; H10K 77/111
  See application file for complete search history.

(56) References Cited

U.S. PATENT DOCUMENTS

| | | |
|---|---|---|
| 2008/0018845 A1 | 1/2008 | Choi |
| 2010/0079838 A1 | 4/2010 | Sano et al. |
| 2012/0008057 A1 | 1/2012 | Takahashi et al. |
| 2013/0033476 A1* | 2/2013 | Dean ..................... G09G 3/344 345/107 |
| 2018/0299953 A1* | 10/2018 | Selker .................. G06F 3/0346 |

FOREIGN PATENT DOCUMENTS

| | | |
|---|---|---|
| CN | 101685173 A | 3/2010 |
| CN | 102253438 A | 11/2011 |
| CN | 102314028 A | 1/2012 |
| CN | 103901607 A | 7/2014 |
| CN | 107238974 A | 10/2017 |
| WO | 2019/017513 A1 | 1/2019 |

* cited by examiner

OPTICAL SWITCH AND CONTROL METHOD THEREOF, AND DISPLAY APPARATUS

CROSS-REFERENCE TO RELATED APPLICATION

This application is a national phase entry under 35 USC 371 of International Patent Application No. PCT/CN2019/122185 filed on Nov. 29, 2019, which is incorporated herein by reference in its entirety.

TECHNICAL FIELD

The present disclosure relates to the field of display technologies, and in particular, to an optical switch and a control method thereof, and a display apparatus.

BACKGROUND

In a display apparatus including an optical waveguide, light from a light source of the display apparatus may be coupled into or out of the optical waveguide through a grating to complete display of the display apparatus.

SUMMARY

In one aspect, an optical switch is provided. The optical switch includes a plurality of micro-grooves, a micro-fluid disposed in each micro-groove of the plurality of micro-grooves, and a driving electrode disposed corresponding to the micro-fluid in each micro-groove. The driving electrode is configured to provide a voltage to a corresponding micro-fluid to control light transmittance of a region where the micro-fluid is located.

In some embodiments, the micro-fluid includes liquid crystal or an electrowetting micro-fluid.

In some embodiments, the driving electrode includes a first electrode and a second electrode that are disposed opposite to each other. The micro-fluid is located between a corresponding first electrode and a corresponding second electrode.

In some embodiments, the driving electrode further includes at least one third electrode on an inner side wall of each micro-groove. One of the first electrode and the second electrode is electrically connected to the at least one third electrode, and the other of the first electrode and the second electrode is insulated from the at least one third electrode, In some embodiments, the driving electrode includes a first electrode and a second electrode that are disposed to be insulated from each other. The micro-fluid is located at a same side of a corresponding first electrode and a corresponding second electrode.

In some embodiments, at least two first electrodes are electrically connected; or, at least two second electrodes are electrically connected; or, at least two first electrodes are electrically connected and at least two second electrodes are electrically connected.

In some embodiments, the optical switch further includes a plurality of first signal lines and a plurality of second signal lines. First electrodes in at least one row are electrically connected to a same first signal line, and second electrodes in at least one column are electrically connected to a same second signal line.

In some embodiments, the first electrode and the second electrode include light-transmitting electrodes.

In some embodiments, the micro-fluid is the electrowetting micro-fluid. The electrowetting micro-fluid includes a light-transmitting micro-fluid and a non-light-transmitting micro-fluid that is immiscible with the light-transmitting micro-fluid. A contact angle of one of the light-transmitting micro-fluid and the non-light-transmitting micro-fluid is capable of being changed when the one of the light-transmitting micro-fluid and the non-light-transmitting micro-fluid is driven by a corresponding driving electrode.

In some embodiments, the non-light-transmitting micro-fluid includes a light-absorbing micro-fluid.

In some embodiments, the optical switch further includes a first substrate and a second substrate that are disposed opposite to each other, and a plurality of light-shielding portions disposed between the first substrate and the second substrate. The plurality of light-shielding portions enclose the plurality of micro-grooves on the first substrate or the second substrate.

In some embodiments, the optical switch further includes at least one support portion disposed between the first substrate and the second substrate.

In another aspect, a control method applied to the optical switch according to any one of the above embodiments is provided. The control method includes: inputting a voltage to at least one driving electrode in a target region, and controlling light transmittance of a region where a corresponding micro-fluid is located by using the at least one driving electrode.

In some embodiments, the control method further includes: inputting different voltages to a same driving electrode in the target region in a time-sharing manner, or inputting different voltages to different driving electrodes at a same time respectively, so as to control the region where the corresponding micro-fluid is located to have different light transmittance.

In yet another aspect, a display apparatus is provided. The display apparatus includes the optical switch according to any one of the above embodiments.

In some embodiments, the display apparatus further includes at least one grating. The optical switch is located at a light exit side of the at least one grating.

In some embodiments, the display apparatus further includes an augmented reality (AR) display screen. The optical switch is located at an ambient light incident side of the AR display screen.

BRIEF DESCRIPTION OF THE DRAWINGS

In order to explain technical solutions in some embodiments of the present disclosure more clearly, the accompanying drawings used in some embodiments of the present disclosure will be introduced briefly. Obviously, the accompanying drawings to be described below are merely some embodiments of the present disclosure, and a person of ordinary skill in the art may obtain other drawings according to these drawings.

DETAILED DESCRIPTION

Technical solutions in some embodiments of the present disclosure will be described clearly and completely with reference to accompanying drawings in some embodiments of the present disclosure. Obviously, the described embodiments are merely some but not all embodiments of the present disclosure. All other embodiments obtained on a basis of some embodiments of the present disclosure by a person of ordinary skill in the art shall be included in the protection scope of the present disclosure.

In the field of optics, Fraunhofer diffraction (also referred to as far-field diffraction) is a type of wave diffraction that typically occurs when a field wave passes through a circular hole or a slit. This causes a problem that in a display apparatus including an optical waveguide, if an area of an orthographic projection of a grating on a display surface of the display apparatus is small, when light is coupled into or out of the optical waveguide through the grating, optical crosstalk is easy to occur due to generation of the Fraunhofer diffraction. That is, a display effect of the display apparatus is adversely affected. For example, brightness of an image displayed by the display apparatus is caused to be uneven and the image is caused to be blurred, or display distortion is caused. In addition, in a display apparatus using a pinhole imaging technique, the Fraunhofer diffraction is also easy to occur when light exits through the pinhole, thereby reducing a display effect of the display apparatus.

Figure 1:
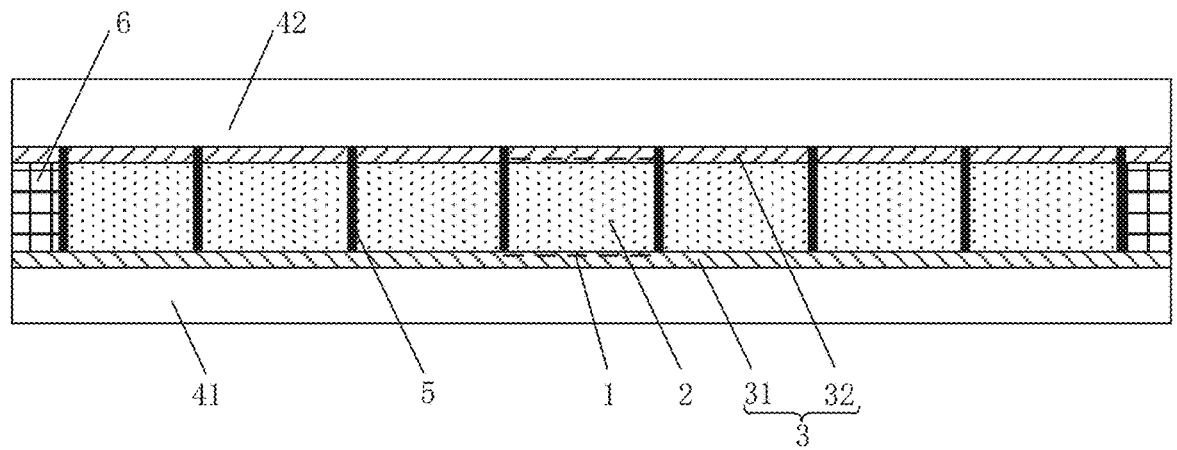
FIG. 1 is a schematic diagram of an optical switch, in accordance with some embodiments of the present disclosure.

On this basis, some embodiments of the present disclosure provide an optical switch. As shown in FIG. 1, the optical switch includes a plurality of micro-grooves 1, a micro-fluid 2 disposed in each micro-groove 1 of the plurality of micro-grooves 1, and a driving electrode 3 disposed corresponding to the micro-fluid 2 in each micro-groove 1. The driving electrode 3 is configured to provide a voltage to a corresponding micro-fluid 2 to control light transmittance of a region where the micro-fluid is located.

The micro-grooves 1 are usually formed on a corresponding carrier. The carrier is, for example, a glass substrate, or a light-transmitting substrate made of light-transmitting resin or light-transmitting polyester compound. Here, specifications of the carrier (e.g., a thickness of the light-transmitting substrate) may be selectively set according to actual needs. For example, the specifications of the carrier are determined after design conditions or process conditions of the optical switch are comprehensively considered. Optionally, an upper surface and a lower surface of the light-transmitting substrate have good flatness and good parallelism.

The plurality of micro-grooves 1 are formed in the corresponding carrier by using an etching process, or a plurality of barrier walls are formed on the corresponding carrier, so that the plurality of barrier walls enclose the micro-grooves 1, both of which are allowed. Some embodiments of the present disclosure do not limit a manner in which the micro-grooves 1 are formed.

In addition, a shape of a notch of a micro-groove 1 may be selectively set according to actual needs. For example, the notch of the micro-groove 1 has a rectangular shape, a rhombus shape, a circular shape or other shapes.

It will be added that, a size of the micro-groove 1 is in an order of micrometers (µm). That is, the size of the micro-groove 1 (e.g., a groove depth, or a groove width) is measured in micrometers as a minimum unit. For example, the groove depth of the micro-groove 1 ranges from 2 µm to 20 µm, inclusive.

The micro-fluid 2 is disposed in a corresponding micro-groove 1. The region where the micro-fluid 2 is located refers to a spatial region in the corresponding micro-groove 1 that is configured to accommodate the micro-fluid 2. In a same optical switch, structures of the plurality of micro-grooves 1 may be the same or different, both of which are allowed. In addition, the plurality of micro-grooves 1 are uniformly distributed or non-uniformly distributed on the carrier, which may be selectively set according to actual needs.

In some examples, the structures of the plurality of micro-grooves 1 are the same, and the plurality of micro-grooves 1 are distributed in an array on the carrier. That is, a spacing between every two adjacent micro-grooves 1 is the same. In some other examples, the plurality of micro-grooves are non-uniformly distributed on the carrier. That is, the carrier has at least two regions, and a distribution density of micro-grooves 1 in each region of the at least two regions is different. For example, the carrier has a first region and a second region that have a same area. A number of micro-grooves 1 distributed in the first region is different from a number of micro-grooves 1 distributed in the second region.

Here, the spacing between two adjacent micro-grooves 1 is related to a control accuracy of a light exit region in the optical switch. For example, in an equal-area region, if the spacing between the two adjacent micro-grooves 1 is small, a distribution density of micro-grooves 1 in this region will be large, which may ensure a high control accuracy of the light exit region in the optical switch.

The micro-fluid 2 in each micro-groove 1 is correspondingly provided with a driving electrode 3. In some examples, the micro-fluid 2 is liquid crystal. By providing voltages of different magnitudes by the driving electrode 3, light transmittance of the corresponding micro-fluid (i.e., the liquid crystal) may be controlled to change. In some other examples, the micro-fluid 2 is an electrowetting micro-fluid. By providing voltages of different magnitudes by the driving electrode 3, a contact angle between the corresponding micro-fluid 2 (i.e., the electrowetting micro-fluid) and a bottom surface of the groove is capable of being changed, thereby controlling the light transmittance of the region where the micro-fluid 2 is located by using a distribution state of the micro-fluid 2 in the corresponding micro-groove 1. In some embodiments of the present disclosure, by selecting the liquid crystal or the electrowetting micro-fluid as the micro-fluid 2 in the optical switch, a fast response speed (e.g., a response time of the optical switch that is less than 30 ms) may be obtained, thereby achieving a fast response of the optical switch, i.e., achieving regulation over light that is not observed by human eyes by using the optical switch.

Of course, a material of the micro-fluid 2 is not limited to the liquid crystal or the electrowetting micro-fluid. Other materials with similar properties are also applicable to the present disclosure.

In some embodiments, with reference to FIG. 1, the optical switch further includes a first substrate 41 and a second substrate 42 that are disposed opposite to each other, and a plurality of light-shielding portions 5 disposed between the first substrate 41 and the second substrate 42. The plurality of light-shielding portions 5 enclose the plurality of micro-grooves 1 in some embodiments described above on the first substrate 41 or the second substrate 42. Here, each light-shielding portion 5 is used as a barrier wall corresponding to a micro-groove 1, and a shape, a size, and a material of the light-shielding portion 5 may be selectively set according to actual needs. For example, the light-shielding portions 5 form a black matrix (abbreviated as BM), which has a simple structure and is easy to manufacture.

After the first substrate 41 and the second substrate 42 are assembled, and the micro-fluid 2 is filled into the corresponding micro-groove 1, through the plurality of light-shielding portions 5, a height of a region where corresponding micro-fluids are located (i.e., a dimension of the region where the micro-fluids are located in a direction perpendicular to the first substrate 41) may be effectively controlled, and light from two adjacent micro-grooves 1 is prevented from interfering with each other, so that local dynamic dimming is achieved by using the optical switch, and adverse effects of ambient light and other stray light are effectively prevented. In addition, a height of a region where each micro-fluid is located may also be controlled by combining the light-shielding portions 5 with a photo spacer.

In some embodiments, with continued reference to FIG. 1, the optical switch further includes at least one support portion 6 disposed between the first substrate 41 and the second substrate 42. The at least one support portion 6 is usually located at an edge of the first substrate 41 and is connected to the second substrate 42 to support an assembly of the first substrate 41 and the second substrate 42, thereby effectively controlling a thickness between the first substrate 41 and the second substrate 42 (i.e., a spacing between the first substrate 41 and the second substrate 42). Here, a shape, a size and a material of a support portion 6 may be selectively set according to actual needs. For example, the support portion 6 is a photo spacer (abbreviated as PS) made of a photoresist material.

For example, the support portion 6 is made of a black photoresist material that is the same as the black matrix. In this way, each support portion 6 is made of a same material as the light-shielding portion 5, which is advantageous for simplifying a manufacturing process, reducing a manufacturing cost, and effectively preventing interference of the ambient light.

In some embodiments, the driving electrode 3 includes a first electrode 31 and a second electrode 32. There are a plurality of ways of arranging the first electrode 31 and the second electrode 32, which may be selectively set according to actual needs.

Figure 8:
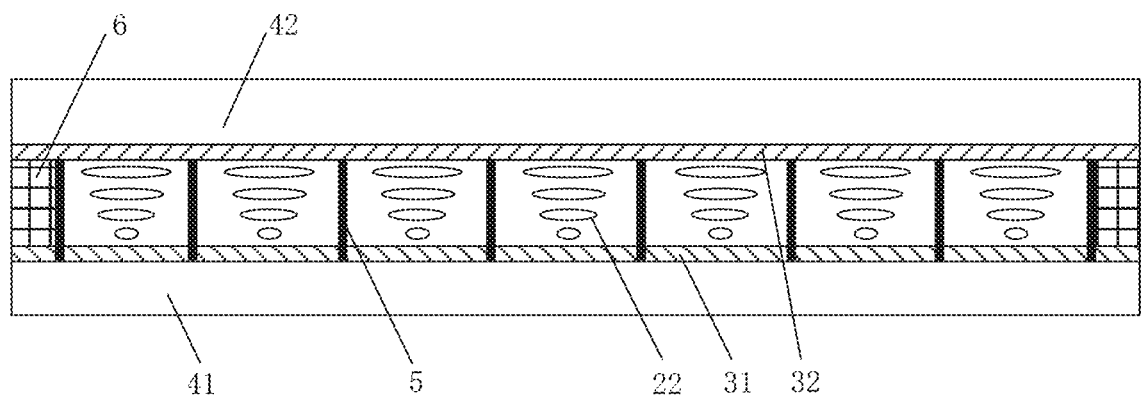
FIG. 8 is a schematic diagram of yet another optical switch, in accordance with some embodiments of the present disclosure.

In one example, as shown in FIG. 8, the first electrode 31 and the second electrode 32 are disposed opposite to each other, and a vertical electric field may be formed between the first electrode 31 and the second electrode 32. The micro-fluid 2 is located between a corresponding first electrode 31 and a corresponding second electrode 32. Optionally, the first electrode 31 provides a driving voltage signal, the second electrode 32 provides a common voltage signal, and the first electrode 31 and the second electrode 32 are both planar electrodes. In a case where the second electrode 32 provides the common voltage signal, second electrodes 32 of driving electrodes 3 are integrally connected.

Figure 10:
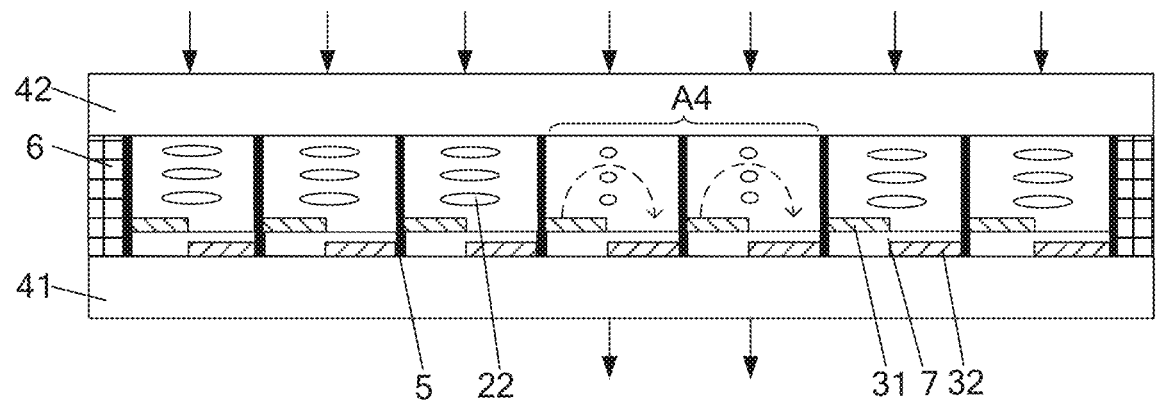
FIG. 10 is a schematic diagram of yet another optical switch, in accordance with some embodiments of the present disclosure.

In another example, as shown in FIG. 10, the first electrode 31 and the second electrode 32 are disposed to be insulated from each other, and the first electrode 31 and the second electrode 32 are located at a same side of a corresponding micro-fluid 2, and an arc-shaped electric field may be formed between the first electrode 31 and the second electrode 32. For example, the second electrode 32, an insulating medium 7 and the first electrode 31 are sequentially stacked at a side of the first substrate 41 proximate to the micro-fluid 2.

Figure 3:
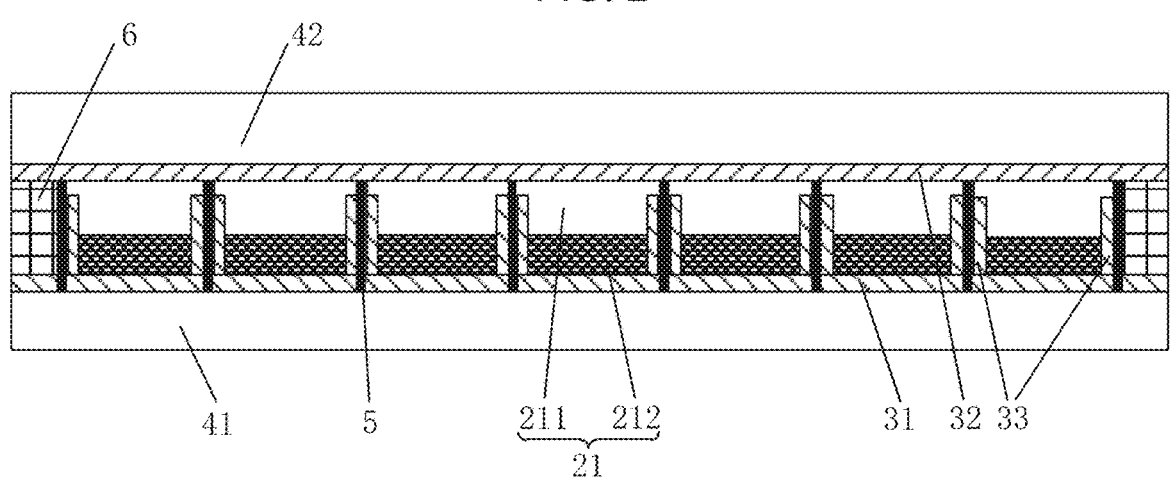
FIG. 3 is a schematic diagram of yet another optical switch, in accordance with some embodiments of the present disclosure.
Figure 4:
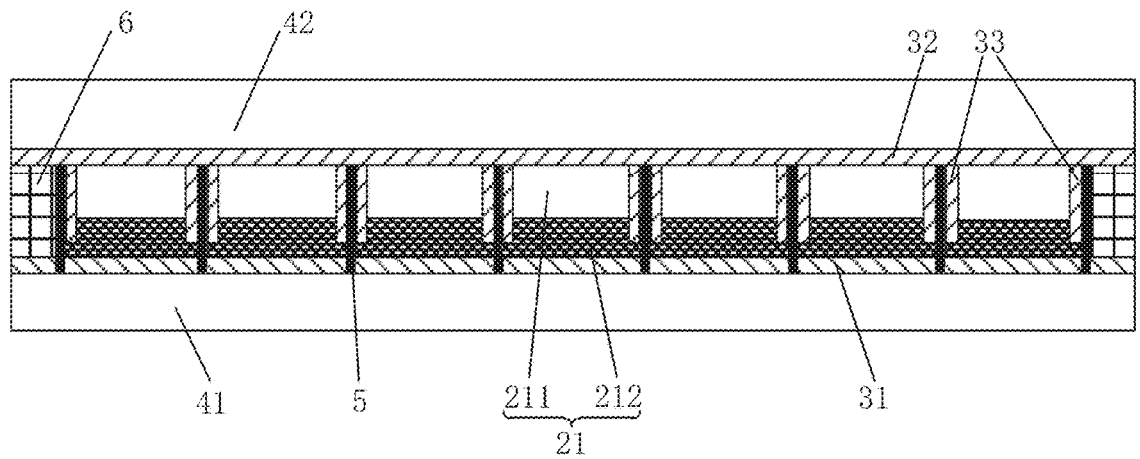
FIG. 4 is a schematic diagram of yet another optical switch, in accordance with some embodiments of the present disclosure.

In yet another example, as shown in FIGS. 3 and 4, the driving electrode 3 further includes at least one third electrode 33 on an inner side wall of each micro-groove 1. In a same driving electrode 3, one of the first electrode 31 and the second electrode 32 is electrically connected to the at least one third electrode 33, and the other of the first electrode 31 and the second electrode 32 is insulated from the at least one third electrode 33, Optionally, in the same driving electrode 3, as shown in FIG. 3, the third electrode 33 is electrically connected to the first electrode 31, and is insulated from the second electrode 32. Or, as shown in FIG. 4, the third electrode 33 is electrically connected to the second electrode 32, and is insulated from the first electrode 31. Both arrangements are allowed. Some embodiments of the present disclosure do not limit this.

In addition, the number of the third electrode(s) 33 and position(s) thereof on the inner side wall of the micro-groove 1 may be selectively set according to actual needs. For example, each micro-groove 1 includes four inner side walls enclosing a rectangle, and at least one inner side wall is provided with one third electrode 33 thereon. In a case where each inner side wall is provided with a third electrode 33 thereon, third electrodes 33 are connected to each other to form a single electrode.

The driving electrode 3 in some embodiments of the present disclosure includes the first electrode 31, the second electrode 32 and the third electrode 33. In this way, control over a multi-directional electric field may be achieved in the micro-groove 1, thereby facilitating to achieve accurate control over the corresponding micro-fluid 2 by the driving electrode 3.

In some examples, the first electrode 31, the second electrode 32 and the third electrode 33 of the driving electrode 3 are all transparent electrodes. The first electrode 31, the second electrode 32 and the third electrode 33 may be made of indium tin oxide (abbreviated as ITO), a metal (e.g., molybdenum (Mo), or silver (Ag)) or other materials. In addition, a thickness of the first electrode 31, a thickness of the second electrode 32, and a thickness of the third electrode 33 may be selectively set according to actual needs, as long as requirements for voltages applied to them may be met. In some examples, the thickness of the first electrode 31, the thickness of the second electrode 32, or the thickness of the third electrode 33 ranges from 50 nm to 1000 nm, inclusive. Typically, the thickness of the first electrode 31, the thickness of the second electrode 32, or the thickness of the third electrode 33 ranges from 70 nm to 300 nm, inclusive.

In some embodiments described above, control over the optical switch in a turn-off state, in a turn-on state or in a gated state is related to the material of the micro-fluids 2 in the corresponding plurality of micro-grooves 1.

Figure 2:
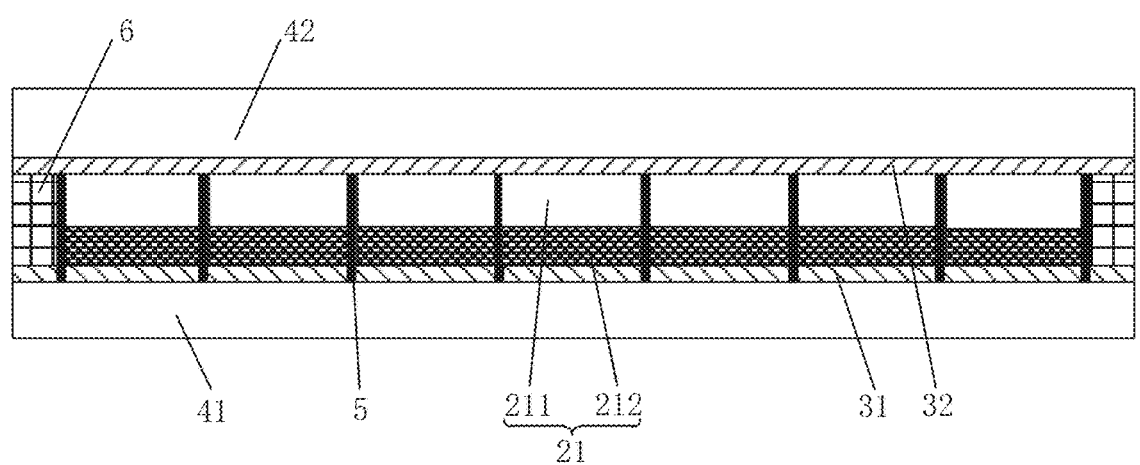
FIG. 2 is a schematic diagram of another optical switch, in accordance with some embodiments of the present disclosure.

In some embodiments, as shown in FIG. 2, the micro-fluid 2 is the electrowetting micro-fluid 21. The electrowetting micro-fluid 21 includes a light-transmitting micro-fluid 211 and a non-light-transmitting micro-fluid 212 that is immiscible with the light-transmitting micro-fluid 211. A contact angle of one of the light-transmitting micro-fluid 211 and the non-light-transmitting micro-fluid 212 may be changed when the one of the light-transmitting micro-fluid 211 and the non-light-transmitting micro-fluid 212 is driven by a corresponding driving electrode 3.

Here, in a case where the light-transmitting micro-fluid 211 is a conductive medium, a contact angle of the light-transmitting micro-fluid 211 is changed when the light-transmitting micro-fluid 211 is driven by the corresponding driving electrode 3. In a case where the non-light-transmitting micro-fluid 212 is a conductive medium, a contact angle of the non-light-transmitting micro-fluid 212 is changed when the non-light-transmitting micro-fluid 212 is driven by the corresponding driving electrode 3.

In some examples, the non-light-transmitting micro-fluid 212 is a non-conductive fluid medium, such as oil doped with a plurality of light-shielding particles. Optionally, the non-light-transmitting micro-fluid 212 is a light-absorbing micro-fluid, and the light-shielding particles are made of melanin (including natural melanin, synthetic melanin, or oxidized melanin). Correspondingly, the light-transmitting micro-fluid 211 is a conductive fluid medium, such as water.

In yet some examples, the non-light-transmitting micro-fluid 212 is a conductive fluid medium. For example, the non-light-transmitting micro-fluid 212 includes water and a melanin solute dissolved in water. Here, water is a conductive substance and is immiscible with the light-transmitting micro-fluid 211. The light-transmitting micro-fluid 211 is a water-insoluble and non-conductive organic substance, such as gasoline.

In addition, optionally, a weight percentage of the melanin solute in the non-light-transmitting micro-fluid 212 ranges from 0.5 wt % to 5 wt %, inclusive.

Of course, a material of the non-light-transmitting micro-fluid 212 is not limited to this. The non-light-transmitting micro-fluid 212 may also be made of other materials that can be non-light-transmissive and exist in a fluid manner, such as electronic ink (E-ink), carbon black or black metal oxide. Correspondingly, a material of the light-transmitting micro-fluid 211 is set to be matched with the material of the non-light-transmitting micro-fluid 212.

It will be noted that, according to different applications of the optical switch, in electrowetting micro-fluids 21, materials of light-transmitting micro-fluids 211 may be different, materials of non-light-transmitting micro-fluids 212 may be different, and ratios of the light transmitting micro-fluids 211 and the non-light-transmitting micro-fluids 212 may be also different. That is, the materials and the ratios may be selectively set according to actual needs. Some embodiments of the present disclosure do not limit this.

In a case where the micro-fluid 2 is the electrowetting micro-fluid 21, with reference to FIGS. 2 and 5 to 7, use of the optical switch will be described below by taking an example in which the light-transmitting micro-fluid 211 is water (which is conductive), and the non-light-transmitting micro-fluid 212 is the oil doped with the plurality of melanin particles (which is non-conductive).

With reference to FIG. 2, in a case where no voltage is applied to each driving electrode 3, surface energy of the light-transmitting micro-fluid 211 is the largest, and there is a largest contact angle between the light-transmitting micro-fluid 211 and a bottom surface of a corresponding micro-groove 1. That is, the light-transmitting micro-fluid 211 is incapable of wetting the bottom surface of the corresponding micro-groove 1. The light-transmitting micro-fluid 211 is immiscible with the non-light-transmitting micro-fluid 212. Therefore, under repulsive interaction of the light-transmitting micro-fluid 211 and the non-light-transmitting micro-fluid 212, the non-light-transmitting micro-fluid 211 and the light-transmitting micro-fluid 212 in each micro-groove 1 may spread parallel to the bottom surface of the corresponding micro-groove 1. In this way, light entering the optical switch may be absorbed by the non-light-transmitting micro-fluid 212 in each micro-groove 1. Therefore, no light passes through the optical switch and then is emitted. That is, the optical switch is in the turn-off state.

Figure 5:
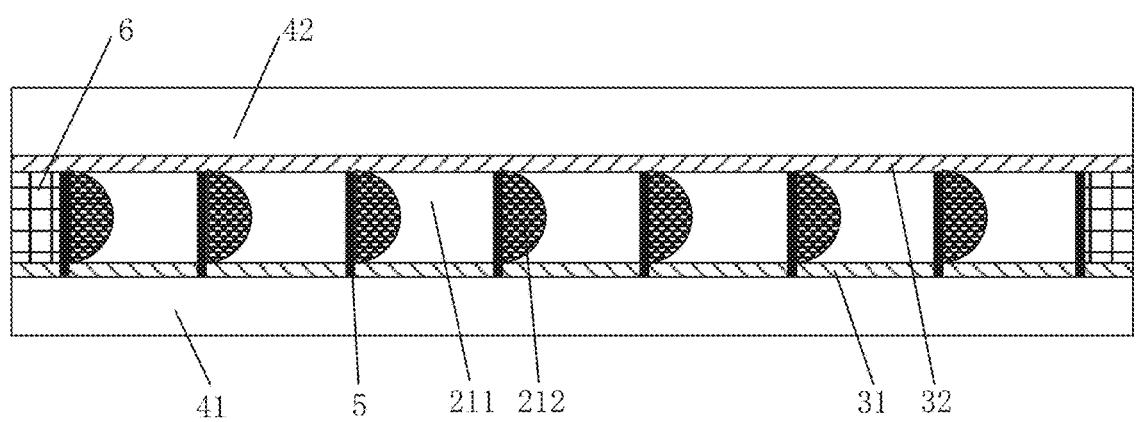
FIG. 5 is a schematic diagram of the optical switch shown in FIG. 2 in a turn-on state.

With reference to FIG. 5, after a voltage is applied to each driving electrode 3, a voltage provided by each driving electrode 3 enables the surface energy of the corresponding light-transmitting micro-fluid 211 to be reduced. In a case where the light-transmitting micro-fluid 211 has the smallest surface energy, there is a smallest contact angle between the light-transmitting micro-fluid 211 and the bottom surface of the corresponding micro-groove 1. That is, the light-transmitting micro-fluid 211 is capable of wetting the bottom surface of the corresponding micro-groove 1. The light-transmitting micro-fluid 211 is immiscible with the non-light-transmitting micro-fluid 212. Therefore, under the repulsive interaction of the light-transmitting micro-fluid 211 and the non-light-transmitting micro-fluid 212, the light-transmitting micro-fluid 211 in each micro-groove 1 may spread parallel to the bottom surface of the corresponding micro-groove 1, and the non-light-transmitting micro-fluid 212 is pushed to at least one inner side wall of the corresponding micro-groove 1. In this way, the light entering the optical switch is capable of passing through the light-transmitting micro-fluid 211 in each micro-groove 1 and then is emitted. That is, the optical switch is in the turn-on state.

The turn-on state or the turn-off state of the optical switch is for the optical switch as a whole. That is to say, in a case where the micro-fluids 2 are made of a same material, a same control condition (e.g., a driving voltage) is provided for the micro-fluids 2 in the micro-grooves 1 in the optical switch, and light transmittance of the regions where the micro-fluids are located will be the same. Of course, if different control conditions are respectively provided for the micro-fluids in different regions in the optical switch, the light transmittance of the regions where the micro-fluids are located will be different. In this way, in the optical switch, one region or a plurality of different regions may be turned on or turned off selectively. That is, the optical switch is in the gated state.

Figure 6:
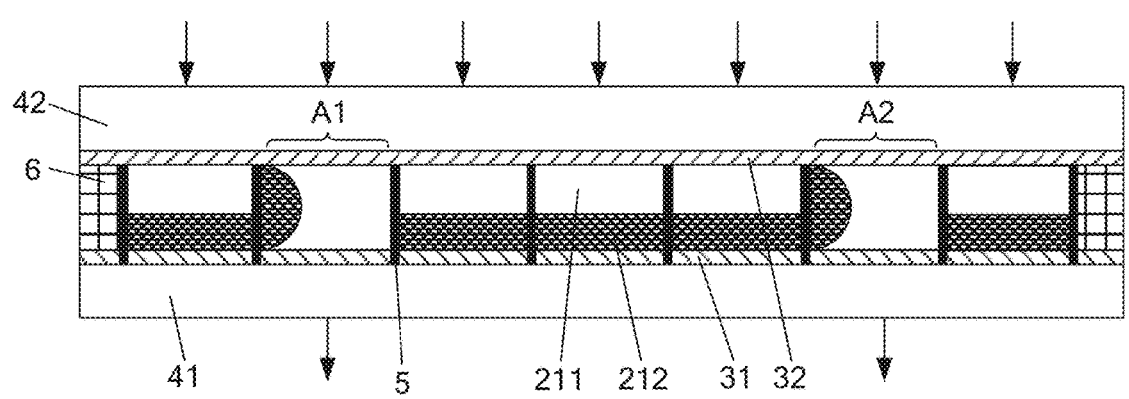
FIG. 6 is a schematic diagram of the optical switch shown in FIG. 2 in a gated state.

With reference to FIG. 6, target regions are selected in the optical switch, and a target region is provided with at least one micro-groove 1 therein. A voltage is input to the at least one driving electrode 3 in the target region, and light transmittance of a region where a corresponding micro-fluid is located may be controlled by using the at least one driving electrode 3. For example, two target regions are selected in the optical switch, which are a first target region A1 and a second target region A2. After applying a voltage to a driving electrode 3 corresponding to each micro-groove I in the first target region A1 and the second target region A2, a light-transmitting micro-fluid 211 corresponding to each micro-groove 1 in the two regions (i.e., A1 and A2) spreads out parallel to a bottom surface of a corresponding micro-groove 1, and a non-light-transmitting micro-fluid 212 in a same micro-groove 1 is pushed to at least one inner side wall of the same micro-groove 1. Thus, the first target region A1 and the second target region A2 in the optical switch are light-transmissive, other regions into which no voltages are applied in the optical switch are non-light-transmissive, and the optical switch is in the gated state.

As such, some embodiments of the present disclosure provide a control method of an optical switch. The control method of the optical switch includes: inputting a voltage to at least one driving electrode in a target region, and controlling light transmittance of a region where a corresponding micro-fluid is located by using the at least one driving electrode. It will be seen that, in some embodiments of the present disclosure, by controlling a gated state of the optical switch, accurate local dynamic dimming may be achieved.

In addition, in some examples, by inputting different voltages to a same driving electrode 3 in the target region in a time-sharing manner, a region where a corresponding micro-fluid is located may be controlled to have different light transmittance. That is, a same region may have different light transmittance at different times.

Figure 7:
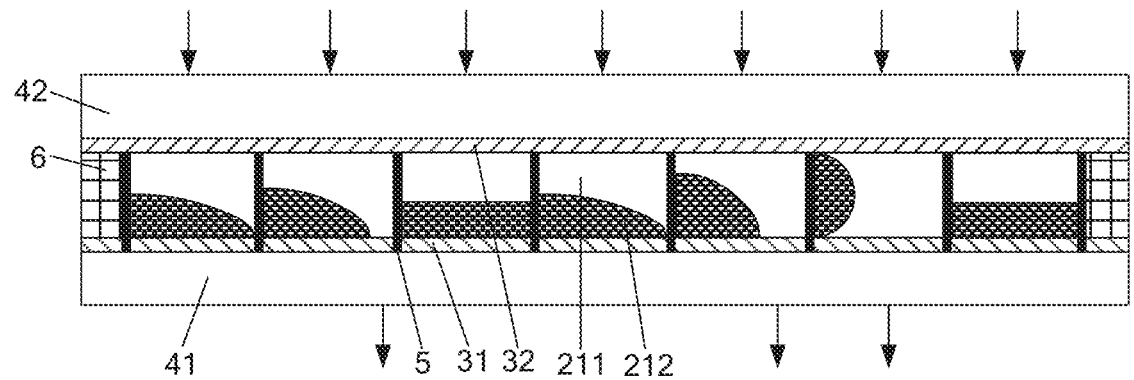
FIG. 7 is a schematic diagram of the optical switch shown in FIG. 2 in another gated state.

Of course, by inputting different voltages to different driving electrodes 3 at a same time, regions where corresponding micro-fluids are located may also be controlled to have different light transmittance. That is, different regions have different light transmittance at the same time. For example, by inputting different voltages to different driving electrodes 3 at the same time, light-transmitting micro-fluids 211 in corresponding micro-grooves 1 will have different surface energy, and distributions of the non-light-transmitting micro-fluids 212 in the micro-grooves 1 are as shown in FIG. 7. That is, under control of the voltages applied to the driving electrodes 3, spreading areas of the non-light-transmitting micro-fluids 212 in the micro-grooves 1 in a direction parallel to bottom surfaces of the micro-grooves are different. In this way, the regions where the micro-fluids are located will have different luminous flux (i.e., light transmittance).

It will be understood that, in the description of some embodiments described above, being light-transmissive or being non-light-transmissive is not an absolute state. That is, being light-transmissive is not a light exit without light loss, and being non-light-transmissive is not without any light signal. Optionally, being light-transmissive means that corresponding light transmittance is greater than or equal to 90%, and being non-light-transmissive means that a corresponding light transmittance is less than or equal to 10%.

In some other embodiments, the micro-fluid 2 is the liquid crystal 22. A material of the liquid crystal 22 may be set according to actual needs.

Figure 9:
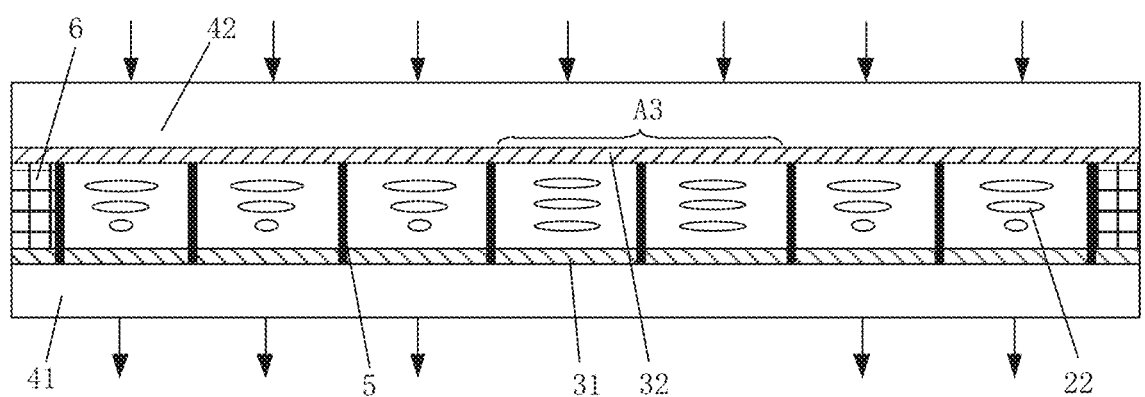
FIG. 9 is a schematic diagram of yet another optical switch, in accordance with some embodiments of the present disclosure.

In some examples, as shown in FIG. 8, the liquid crystal 22 is twisted nematic (abbreviated as TN) liquid crystal, which may ensure a high response speed of the optical switch, The driving electrode 3 corresponding to the TN liquid crystal in each micro-groove 1 includes the first electrode 31 and the second electrode 32 disposed at two opposite sides of the TN liquid crystal. The first electrode 31 is configured to provide a driving voltage signal to the TN liquid crystal, and the second electrode 32 is configured to provide a common voltage signal to the TN liquid crystal. The TN liquid crystal is light-transmissive in a non-energized state. With reference to FIG. 9, a third target region A3 is selected in the optical switch, and a voltage is input to each driving electrode 3 in the third target region A3. In this way, liquid crystal molecules of corresponding TN liquid crystal may be deflected under action of an electric field formed by the driving electrode 3, so that the TN liquid crystal in the third target region A3 is changed from being light-transmissive to being non-light-transmissive. In this way, the third target region A3 in the optical switch is non-light-transmissive, other regions into which no voltages are applied in the optical switch are light-transmissive, and the optical switch is in the gated state.

In some other examples, as shown in FIG. 10, the liquid crystal 22 is in-plane switching (abbreviated as IPS) liquid crystal or advanced super dimension switch (abbreviated as ADS) liquid crystal.

For example, the liquid crystal 22 is the IPS liquid crystal. The driving electrode 3 corresponding to the IPS liquid crystal in each micro-groove 1 includes the first electrode 31 and the second electrode 32 disposed at two sides of the IPS liquid crystal. The first electrode 31 is configured to provide a driving voltage signal to the IPS liquid crystal, and the second electrode 32 is configured to provide a common voltage signal to the IPS liquid crystal. The IPS liquid crystal is non-light-transmissive in the non-energized state. With reference to FIG. 10, a fourth target region A4 is selected in the optical switch, and a voltage is input to each driving electrode 3 in the fourth target region A4. In this way, liquid crystal molecules of corresponding IPS liquid crystal may be deflected under action of an electric field formed by the driving electrode 3, so that the IPS liquid crystal in the fourth target region A4 is changed from being non-light-transmissive to being light-transmissive. In this way, the fourth target region A4 in the optical switch is light-transmissive, other regions into which no voltages are applied in the optical switch are non-light-transmissive, and the optical switch is in the gated state.

In some embodiments, by controlling each driving electrode 3 in a corresponding target region in the optical switch according to requirements for a light exit shape, the light exit region in the optical switch may have a determined shape, such as a circle shape or a rectangle shape, in the gated state according to a fitting shape of the region where the micro-fluid corresponding to the driving electrode 3 is located. The greater a distribution density of the micro-grooves 1 in the optical switch is, that is, the greater the number of drive electrodes 3 in an equal-area region is, the higher a shaping accuracy of the shape of the light exit region in the optical switch that may be controlled by each driving electrode 3, thereby achieving accurate control over the light exit region in the optical switch.

In some other embodiments, the driving electrode 3 corresponding to the micro-fluid 2 in each micro-groove 1 includes the first electrode 31 and the second electrode 32. Whether first electrodes 31 or second electrodes 32 corresponding to different micro-fluids 2 are electrically connected is related to voltage signals provided by the first electrodes 31 or the second electrodes 32.

In some examples, the first electrode 31 provides a driving voltage signal, and the second electrode 32 provides a common voltage signal. At least two first electrodes 31 are electrically connected. By using a shape of a pattern formed by electrically connecting the at least two first electrodes 31, it may be ensured that the light exit region in the optical switch has a determinate shape when a driving voltage signal is input to the at least two first electrodes. Correspondingly, second electrodes 32 corresponding to the at least two first electrodes 31 may be electrically connected or may not be electrically connected, both of which are allowed.

Figure 11:
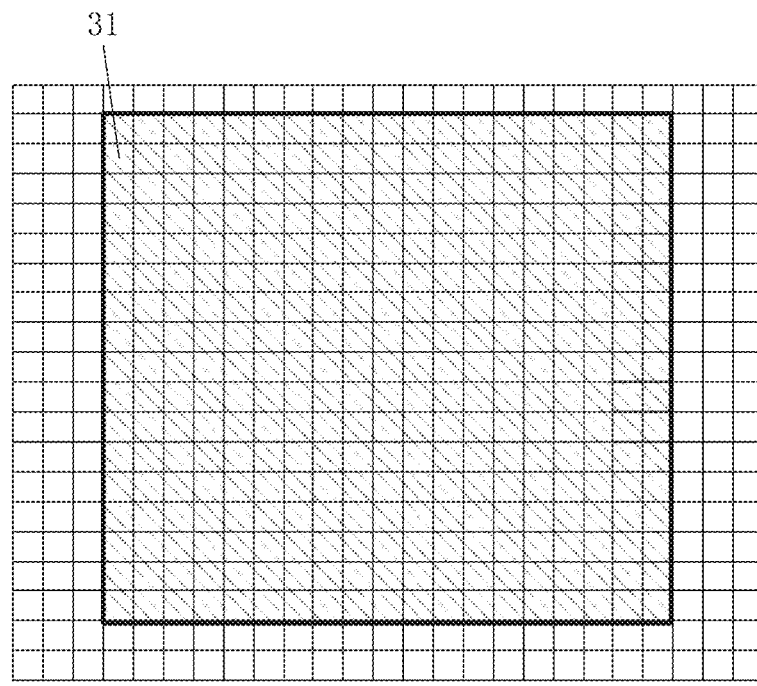
FIG. 11 is a schematic diagram of a driving electrode, in accordance with some embodiments of the present disclosure.

For example, as shown in FIG. 11, at least two first electrodes 31 are electrically connected to form a square electrode. By applying a driving voltage signal to the square electrode, light transmittance of a region where the square electrode is located may be controlled, so that the light exit region in the optical switch has a square shape.

In some other examples, the first electrode 31 provides a common voltage signal, and the second electrode 32 provides a driving voltage signal. At least two second electrodes 32 are electrically connected. By using a shape of a pattern formed by electrically connecting the at least two second electrodes 32, it may be ensured that the light exit region in the optical switch has a determinate shape when a driving voltage signal is input to the at least two second electrodes. Correspondingly, first electrodes 31 corresponding to the at least two second electrodes 32 may be electrically connected or may not be electrically connected, both of which are allowed.

Figure 12:
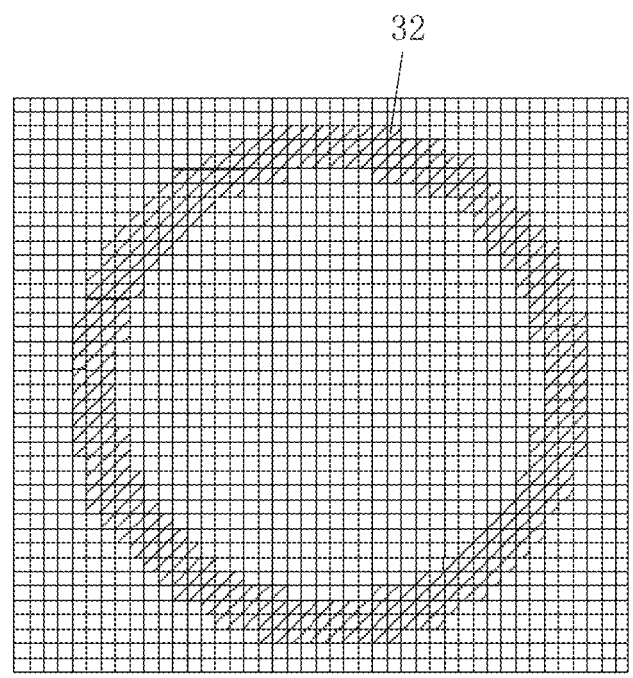
FIG. 12 is a schematic diagram of another driving electrode, in accordance with some embodiments of the present disclosure.

For example, as shown in FIG. 12, at least two second electrodes 32 are electrically connected to form an annular electrode. By applying a driving voltage signal to the annular electrode, light transmittance of a region where the annular electrode is located may be controlled, so that the light exit region in the optical switch has an annular shape.

Figure 13:
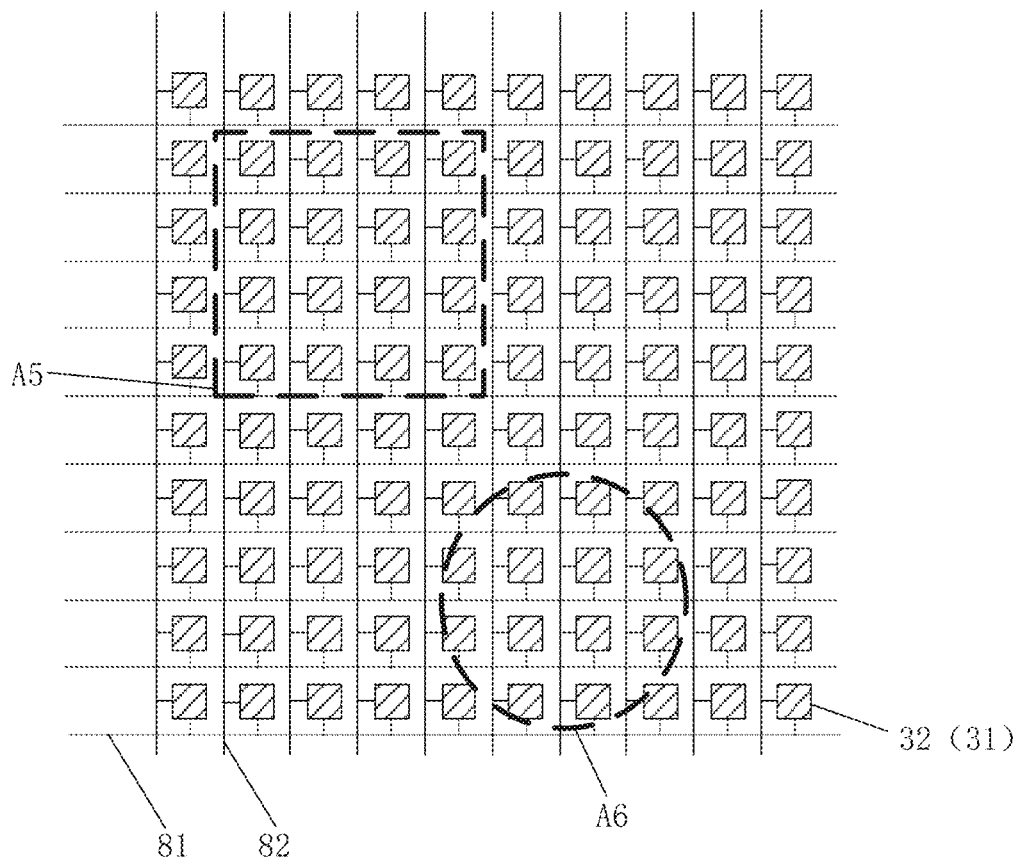
FIG. 13 is a schematic diagram of yet another driving electrode, in accordance with some embodiments of the present disclosure.

In yet some embodiments, the plurality of micro-grooves 1 are distributed in an array. With reference to FIG. 13, the optical switch further includes a plurality of first signal lines 81 and a plurality of second signal lines 82 that are insulated from each other and are crosswise arranged. First electrodes 31 in at least one row are electrically connected to a same first signal line 81, and second electrodes 32 in at least one column are electrically connected to a same second signal line 82.

A voltage signal input to corresponding first electrodes 31 through the first signal line 81 and a voltage signal input to corresponding second electrodes 32 through the second signal line 82 may control light transmittance of a region corresponding to a node where the first signal line 81 and the second signal line 82 in the optical switch are crosswise arranged. In this way, through the interleaving control of the plurality of first signal lines 81 and the plurality of second signal lines 82, the shape of the light exit region of the optical switch may be effectively controlled to be, for example, square, rectangular or circular, For example, with reference to FIG. 13, a fifth target region A5 and a sixth target region A6 are selected in the optical switch. By using voltage signals input through first signal lines 81 and second signal lines 82 passing through the fifth target region A5, the optical switch may be controlled to have a square light exit region having a same shape as the fifth target region A5. By using voltage signals input through first signal lines 81 and second signal lines 82 passing through the sixth target region A6, the optical switch may be controlled to have a circular light exit region having a same shape as the sixth target region A6.

Here, the circular shape of the sixth target region A6 that is shown is only an example. In a case where a distribution density of the first signal lines 81 and the second signal lines 82 is very large, the region corresponding to the node where one first signal line 81 and one second signal line 82 are crosswise arranged may be regarded as a point. In this way, by controlling light transmittance of the region corresponding to the node where the first signal line 81 and the second signal line 82 are crosswise arranged in the optical switch, a circular light exit region may be obtained through fitting.

In some embodiments of the present disclosure, the optical switch includes the plurality of micro-grooves 1, the micro-fluid 2 disposed in each micro-groove 1, and the driving electrode 3 disposed corresponding to the micro-fluid 2 in each micro-groove 1. A structure of the optical switch is light and thin, and the optical switch may be applied to a display apparatus having a grating, such as an optical waveguide display apparatus, so as to achieve an ultra-light weight and an ultra-small thickness of the display apparatus. In addition, through separate control over each driving electrode 3 in the optical switch, i.e., control over the gated state of the optical switch, the local dynamic dimming may be effectively achieved. In this way, after the optical switch is applied to the display apparatus having the grating or a display apparatus using a pinhole imaging technique, light diffracted from the grating or light exiting from the pinhole is regulated by the optical switch. For example, by using the optical switch to dynamically control a region from which light needs to exit to be light-transmissive, and to control a corresponding region where interference light is located to be non-light-transmissive or to control effective absorption of the interference light, optical crosstalk caused by the Fraunhofer diffraction may be effectively reduced or eliminated, thereby improving a display effect of the display apparatus.

In addition, the optical switch may also be applied to other apparatuses or devices that require dimming, such as an augmented reality (abbreviated as AR)/virtual reality (abbreviated as VR) display apparatus, a smart window, glass, or glasses.

Some embodiments of the present disclosure provide a display apparatus to which the above optical switch is applied.

Figure 14:
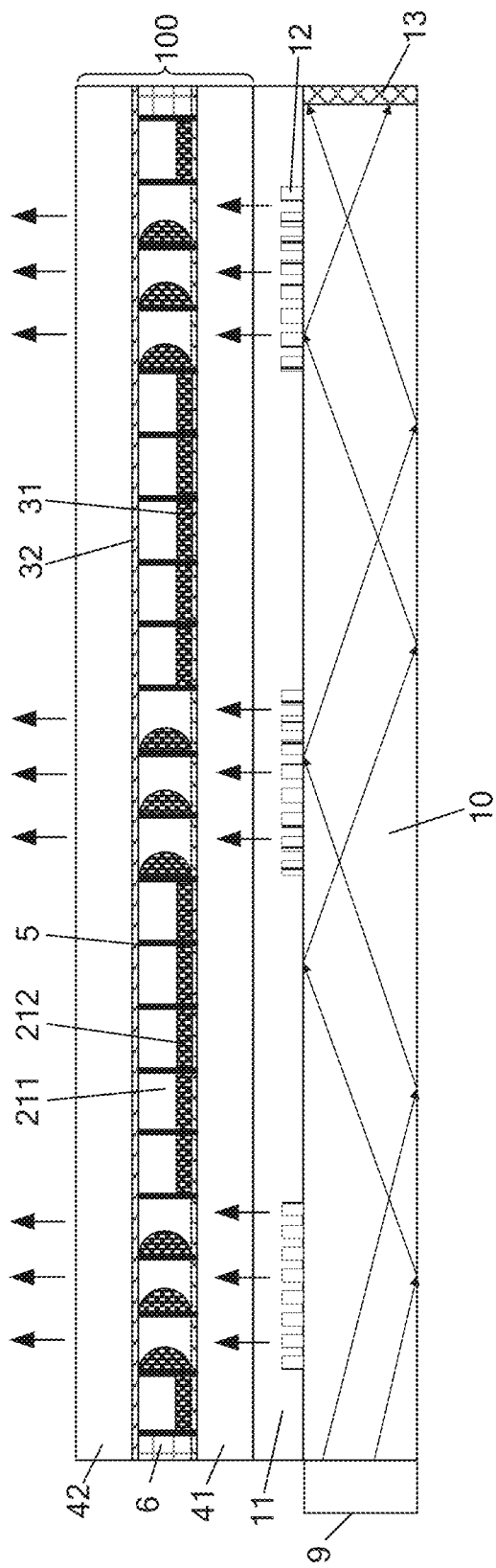
FIG. 14 is a schematic diagram of a display apparatus, in accordance with some embodiments of the present disclosure.
Figure 15:
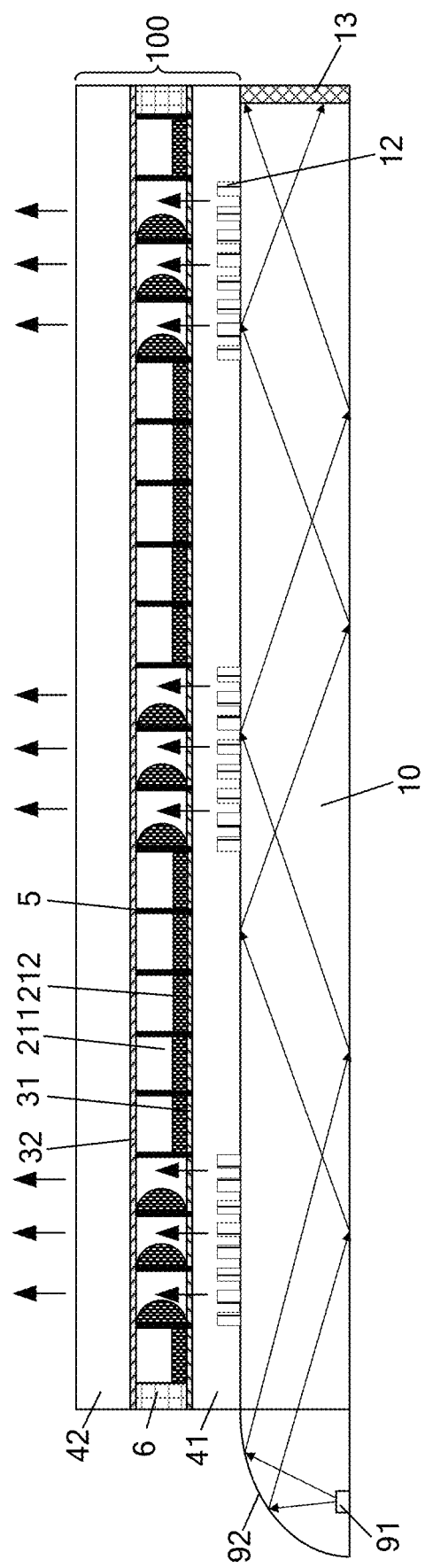
FIG. 15 is a schematic diagram of another display apparatus, in accordance with some embodiments of the present disclosure.

In some embodiments, with reference to FIGS. 14 and 15, the display apparatus includes the optical switch 100 and at least one grating 12. The optical switch 100 is located at a light exit side of the at least one grating 12. In this way, light diffracted from the at least one grating 12 may accurately exit under gating control of the optical switch 100. For example, by controlling a region facing the at least one grating 12 in the optical switch to be light-transmissive, and controlling a region in the optical switch other than the region facing the at least one grating 12 to be non-light-transmissive (that is, controlling the corresponding region where the interference light is located to be non-light-transmissive or controlling the effective absorption of the interference light), light exiting through the optical switch 100 in the display apparatus may be light required for display (i.e., collimated light diffracted from the grating), thereby reducing or eliminating the effect of the optical crosstalk caused by the Fraunhofer diffraction.

In some examples, if a size and weight of the display apparatus have no adverse effect on a use effect of the display apparatus, for example, the display apparatus is a desktop display apparatus or a monitor, the optical switch 100 in some embodiments described above may be directly attached to a corresponding position in the display apparatus as a finished product.

For example, with reference to FIG. 14, the display apparatus is an optical waveguide display apparatus. The display apparatus includes: an optical waveguide 10, a backlight source 9 disposed at a light incident side of the optical waveguide 10, at least one grating 12 disposed at a light exit side of the optical waveguide 10, and the optical switch 100 disposed at the light exit side of the at least one grating 12.

Here, each grating 12 includes a plurality of sub-gratings. The number of the sub-gratings and a spacing between two adjacent sub-gratings may be set according to actual needs.

In addition, optionally, as shown in FIG. 14, the optical waveguide 10 is a light guide plate with a refractive index of 1.52, and the backlight source 9 is located at a side of the light guide plate. The display apparatus further includes a reflective layer 13 disposed at a side of the optical waveguide 10 opposite to the backlight source 9. Light entering from the backlight source 9 in the light guide plate is capable of propagating in the light guide plate in a total reflection manner, and is coupled out of a region where each grating 12 is located. The reflective layer 13 is capable of reflecting the light in the light guide plate to prevent leakage of light signals and effectively improve a light energy utilization rate of the backlight source 9.

With continued reference to FIG. 14, the display apparatus further includes a planarization layer 11 disposed at a side of the at least one grating 12 facing away from the optical waveguide 10. The first substrate 41 in the optical switch 100 is attached to a surface of the planarization layer 11 facing away from the at least one grating 12. The light signals coupled out of the region where each grating 12 is located in the display apparatus may exit in a collimated manner under control of the optical switch 100.

It will be worth mentioning that, in the display apparatus, by inputting different voltages to a same driving electrode 3 in a target region of the optical switch 100 in a time-sharing manner, or by inputting different voltages to different driving electrodes 3 in the optical switch 100, a region where a corresponding micro-fluid 2 is located may be effectively controlled to have different light transmittance, thereby achieving fast switching of different gray scales in the display apparatus, For example, with reference to FIG. 7, the micro-fluid 2 is the electrowetting micro-fluid 21, the light transmitting micro-fluid 211 in the electrowetting micro-fluid 21 is water (which is conductive), and the non-light-transmitting micro-fluid 212 is the oil doped with the plurality of melanin particles (which is non-conductive). The first electrode 31 in the driving electrode 3 provides a driving voltage signal, and the second electrode 32 provides a common voltage signal. In this case, by inputting different voltages to different first electrodes 31 respectively, different gray scale display may be obtained. Optionally, if a driving voltage input to a first electrode 31 is a threshold voltage Vth, a region where a micro-fluid 2 corresponding to the first electrode 31 is located will have the maximum light transmittance, and a maximum gray scale (e.g., a gray scale with a value of 255) may be correspondingly displayed. If a driving voltage input to a first electrode 31 is 0V (i.e., no voltage being applied), a region where a micro-fluid 2 corresponding to the first electrode 31 is located will be non-light-transmissive, and a minimum gray scale (e.g., a gray scale with a value of 0) may be correspondingly displayed. If a driving voltage input to a first electrode 31 is between 0V and Vth, a light transmittance of a region where a micro-fluid 2 corresponding to the first electrode 31 is located will be between the maximum light transmittance and the minimum light transmittance, and other gray scales between the maximum gray scale and the minimum gray scale may be correspondingly displayed.

In some other examples, if the size and the weight of the display apparatus have a great effect on the use effect of the display apparatus, for example, the display apparatus is a head-mounted display apparatus or a mobile display apparatus, the optical switch 100 in some embodiments described above may be integrated onto a display substrate of the display apparatus to achieve the ultra-light weight and the ultra-small thickness of the display apparatus.

For example, with reference to FIG. 15, and partial structures in the display apparatus are the same as corresponding structures in the display apparatus shown in FIG. 14. Parts with same structures of the two display apparatuses will not be described in detail here, and only differences between the two display apparatuses will be described below.

With continued reference to FIG. 15, in the display apparatus, the backlight source 9 includes a light bar 91 and a reflective cover 92. The light bar 91 is disposed in the reflective cover 92, and light emitted by the light bar 91 may enter the optical waveguide 10 under reflection action of the reflective cover 92. Optionally, the light bar 91 is a light-emitting diode (abbreviated as LED) light bar.

In a case where the display apparatus includes the planarization layer 11, the plurality of micro-grooves 1 in the optical switch 100 may be directly formed in or on a surface of the planarization layer 11. That is, taking the planarization layer 11 as the carrier of each micro-groove 1 in the optical switch, the optical switch 100 is integrated onto the display substrate of the display apparatus to further reduce the thickness of the display apparatus.

In some other embodiments, the display apparatus is the AR/VR display apparatus, which may achieve switching display between the AR and the VR. With reference to FIGS. 16 to 19, the display apparatus includes the optical switch 100 and an AR display screen 14. The optical switch 100 is located at an ambient light incident side of the AR display screen 14. The AR display screen 14 includes an optical waveguide display substrate 140 and a display portion 141 located at a display light incident side of the optical waveguide display substrate 140. The optical waveguide display substrate 140 is provided with a coupling-in grating 142 and a coupling-out grating 143 therein.

Optionally, an edge of the optical switch 100 is adhered to the AR display screen 14 through an adhesive layer 15, and an air interlayer 16 is disposed between the optical switch 100 and the AR display screen 14. In this way, in a case where a refractive index of the first substrate 41 in the optical switch 100 is the same as or similar to a refractive index of the optical waveguide display substrate 140 in the AR display screen 14, it is possible to prevent the optical switch 100 from interfering with total reflection of display light signals in the optical waveguide display substrate 140 by using the air interlayer 16.

Figure 16:
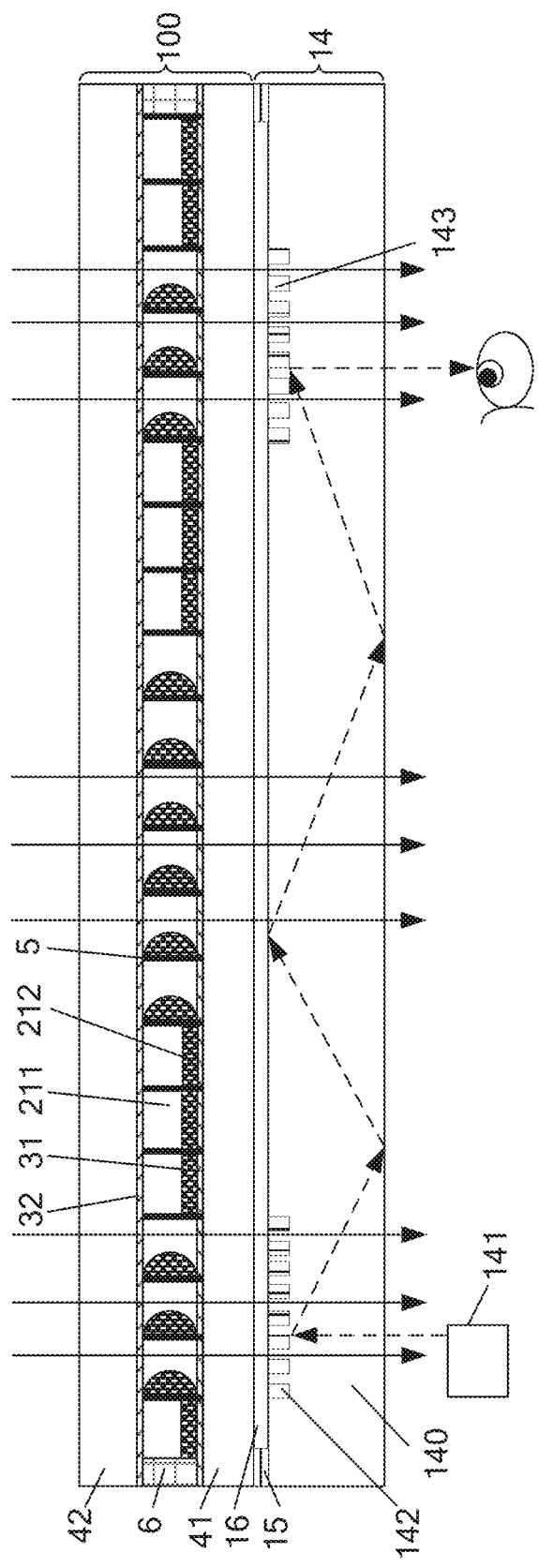
FIG. 16 is a schematic diagram of yet another display apparatus, in accordance with some embodiments of the present disclosure.
Figure 17:
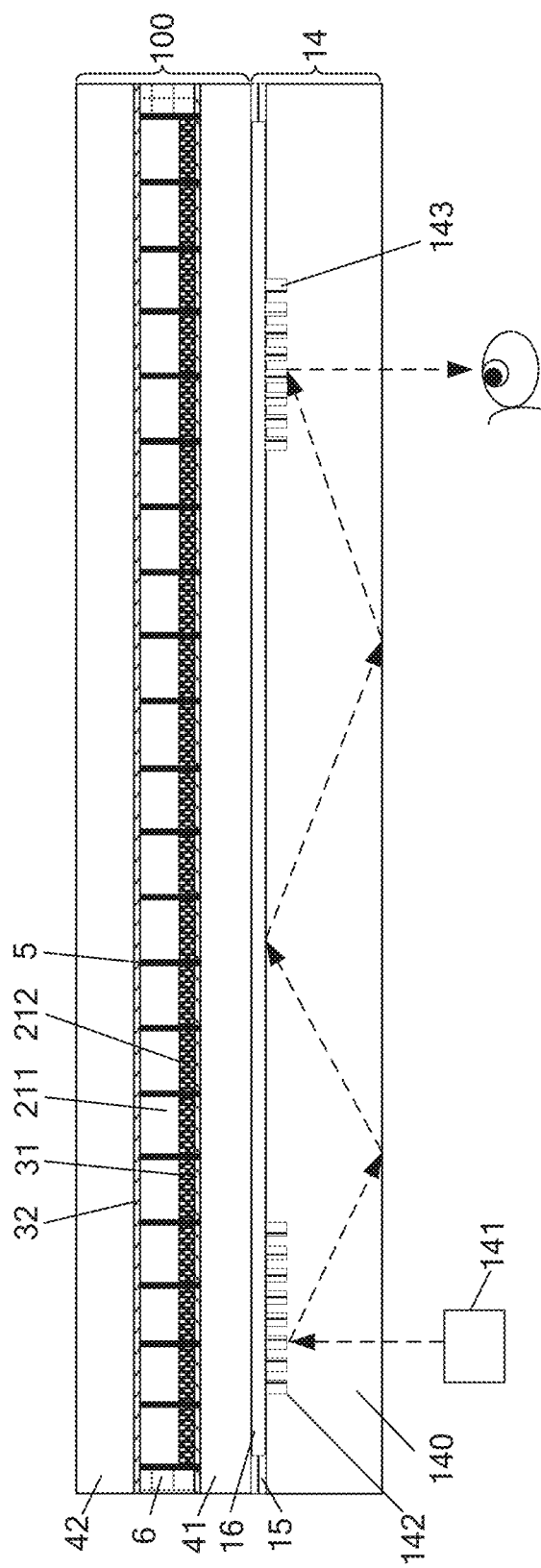
FIG. 17 is a schematic diagram of the display apparatus shown in FIG. 16 in a virtual reality (VR) state.

In some examples, with reference to FIGS. 16 and 17, the display light incident side and the ambient light incident side are located on both sides of the optical waveguide display substrate 140, and the display portion 141 is a display light source, When the display apparatus is used to implement AR display, as shown in FIG. 16, the optical switch 100 is in the turn-on state or the gated state, and ambient light signals are capable of passing through light-transmitting regions in the optical switch 100 and entering the AR display screen 14. In this case, after entering the optical waveguide display substrate 140 through the coupling-in grating 142, the display light signals emitted by the display light source are capable of propagating in the optical waveguide display substrate 140 in a total reflection manner. After passing through the light-transmitting regions in the optical switch 100 and entering the optical waveguide display substrate 140, the ambient light signals can merge with the display light signals and enter the human eyes through the coupling-out grating, so that the human eyes may view an AR image combining virtuality and reality.

In addition, optionally, as shown in FIG. 16, a region in the optical switch 100 facing a peripheral region of the coupling-in grating 142 is controlled to be non-light-transmissive, and a region in the optical switch 100 facing a peripheral region of the coupling-out grating 142 is controlled to be non-light-transmissive. By using a boundary between the light-transmitting regions and the non-light-transmitting regions in the optical switch 100, adverse crosstalk between the ambient light signals and the light diffracted from the gratings may also be effectively reduced.

When the display apparatus is used to implement VR display, as shown in FIG. 17, the optical switch 100 is in the turn-off state, and the ambient light is incapable of passing through the optical switch 100 and entering the AR display screen 14. After entering the optical waveguide display substrate 140 through the coupling-in grating 142, the display light signals emitted by the display light source 141 are capable of propagating in the optical waveguide display substrate 140 in the total reflection manner. Then, the display light signals enter the human eyes through the coupling-out grating 143, so that the human eyes may view a virtual VR image.

Figure 18:
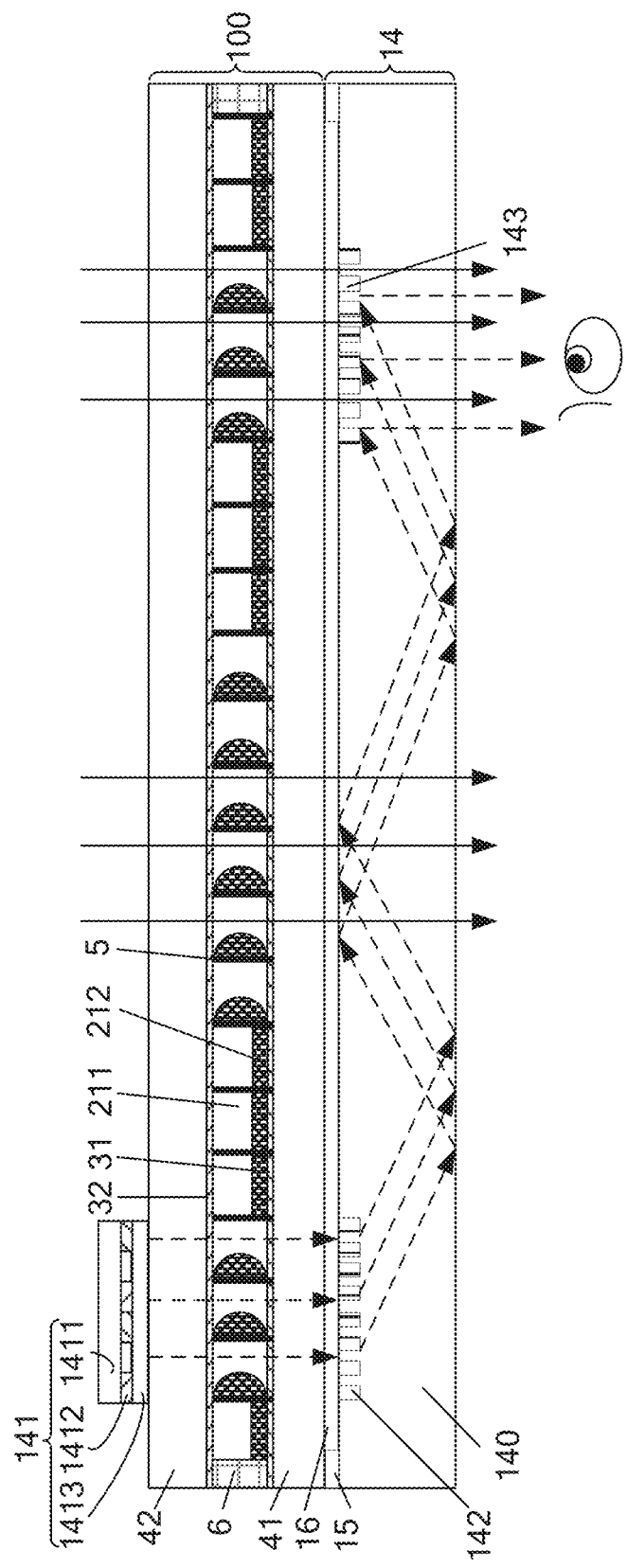
FIG. 18 is a schematic diagram of yet another display apparatus, in accordance with some embodiments of the present disclosure.
Figure 19:
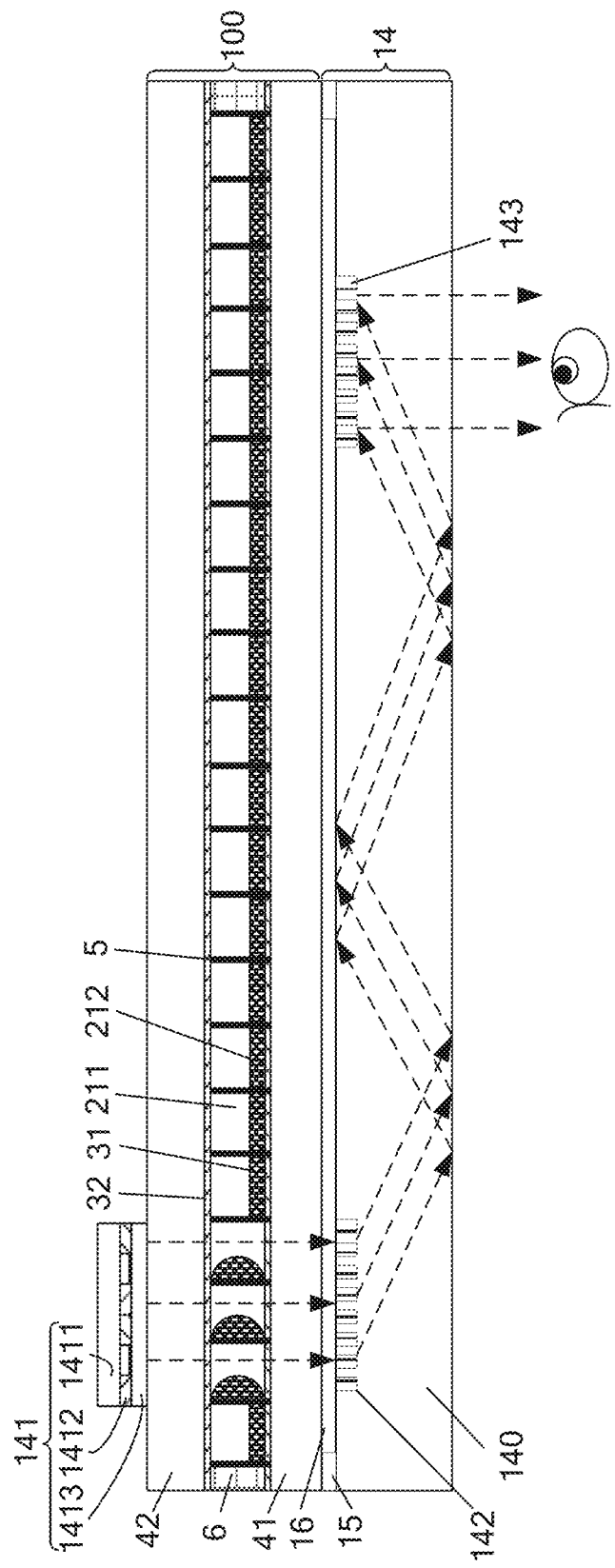
FIG. 19 is a schematic diagram of the display apparatus shown in FIG. 18 in a VR state.

In some other examples, with reference to FIGS. 18 and 19, the display light incident side and the ambient light incident side are located on a same side of the optical waveguide display substrate 140. The display portion 141 includes a display micro-screen 1411, a color filter portion 1412 and a light collimation portion 1413 that are sequentially arranged in an incident direction of the display light signals.

When the display apparatus is used to implement the AR display, as shown in FIG. 18, the optical switch 100 is in the turn-on state or the gated state, and the display light signals and the ambient light signals are both capable of passing through the light-transmitting regions in the optical switch 100 and entering the AR display screen 14. In this case, after being filtered by the color filter portion 1412 and being collimated by the light collimation portion 1413, display light signals emitted by the display micro-screen 1411 pass through the light-transmitting regions in the optical switch 100 and enter the optical waveguide display substrate 140 through the coupling-in grating 142, and then propagate in the optical waveguide display substrate 140 in the total reflection manner. After passing through the light-transmitting regions in the optical switch 100 and entering the optical waveguide display substrate 140, the ambient light signals can merge with the display light signals and enter the human eyes through the coupling-out grating, so that the human eyes may view an AR image combining the virtuality and the reality.

In addition, optionally, as shown in FIG. 18, a region in the optical switch 100 facing a peripheral region of the coupling-in grating 142 is controlled to be non-light-transmissive, and a region in the optical switch 100 facing a peripheral region of the coupling-out grating 142 is controlled to be non-light-transmissive. By using a boundary between the light-transmitting regions and the non-light-transmitting regions in the optical switch 100, adverse crosstalk between the ambient light signals and the light diffracted from the gratings may also be effectively reduced.

When the display apparatus is used to implement VR display, as shown in FIG. 19, a region in the optical switch 100 facing the coupling-in grating 142 is controlled to be light-transmissive, and other regions except for this region are controlled to be non-light-transmissive. In this way, the ambient light signals are incapable of passing through the optical switch 100 and entering the AR display screen 14. After being filtered by the color filter portion 1412 and being collimated by the light collimation portion 1413, the display light signals emitted by the display micro-screen 1411 pass through the light-transmitting region in the optical switch 100 and enter the optical waveguide display substrate 140 through the coupling-in grating 142. Then, the display light signals propagate in the optical waveguide display substrate 140 in the total reflection manner, and finally enter the human eyes through the coupling-out grating, so that the human eyes may view a virtual VR image.

In some embodiments of the present disclosure, the optical switch 100 is disposed at the ambient light incident side of the AR display screen 14, so that the display apparatus may be switched between the AR display and the VR display by controlling the optical switch 100, and operation is simple and convenient. In addition, adverse interference caused by grating diffraction or pinhole diffraction in the AR display screen 14 may be reduced by dynamically regulating and controlling the optical switch, so as to ensure that the AR display screen 14 displays a clear and accurate center image (i.e., an image after the interference caused by the grating diffraction or the pinhole diffraction is removed).

It will be noted that, by using the optical switch to control light effects of coupling-out light signals in a visible range of the human eyes to be substantially the same, the human eyes may view a continuous image with uniform brightness.

In addition, in yet some examples, the display apparatus further includes a human eye tracking sensor located at a display light exit side of the AR display screen 14. In this way, by using the human eye tracking sensor to track a position observed by the human eyes, the optical switch and a turn-on state or a turn-off state of the coupling-in grating and the coupling-out grating in the AR screen 14 may be dynamically regulated according to the position observed by the human eyes, thereby considering display effects of maximum light effect (facilitating to view a clear image with high contrast in an outdoor environment) and uniform light exit (ensuring uniform brightness of an entire image).

A structure and use of the human eye tracking sensor may be selectively set according to actual needs. Sizes and positions of regions where the coupling-in grating and the coupling-out grating in the AR screen 14 are located may also be selectively set according to actual needs.

In some embodiments described above, driving signals for dynamically regulating the optical switch and driving signals corresponding to the display light signals in the AR display screen are synchronous signals. That is, a size of a light signal coupling-out region, a diffraction intensity of the gratings and a diffraction range of the gratings may be pre-determined through a same controller or processor, thereby outputting the driving signals in real time to dynamically regulate the optical switch, and further reducing the optical crosstalk and the interference caused by the grating diffraction by using the optical switch.

It will be noted that arrows "→" in FIGS. 1 to 19 are only used to indicate a transmission direction of light and are not limited to an actual transmission path of the light.

In the description of the above embodiments, specific features, structures, materials or characteristics may be combined in any suitable manner in any one or more embodiments or examples.

The foregoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. An optical switch, comprising:
   a plurality of micro-grooves;
   a micro-fluid disposed in each micro-groove of the plurality of micro-grooves;
   a driving electrode disposed corresponding to the micro-fluid in each micro-groove, the driving electrode being configured to provide a voltage to a corresponding micro-fluid to control light transmittance of a region where the micro-fluid is located;
   a first substrate and a second substrate that are disposed opposite to each other; and
   a plurality of light-shielding portions disposed between the first substrate and the second substrate, the plurality of light-shielding portions enclosing the plurality of micro-grooves on the first substrate or the second substrate;
   wherein the driving electrode includes a first electrode and a second eletrode that are disposed opposite to each other, and at least one third electrode on an inner side wall of each micro-groove;
   the micro-fluid is located between a corresponding first electrode and a corresponding second electrode; and
   one of the first electrode and the second electrode is electrically connected to the at least one third electrode, and the other of the first electrode and the second electrode is insulated from the at least one third electrode.

2. The optical switch according to claim 1, wherein the micro-fluid includes liquid crystal or an electrowetting micro-fluid.

3. The optical switch according to claim 1, wherein
   at least two first electrodes are electrically connected;
   or, at least two second electrodes are electrically connected;
   or, at least two first electrodes are electrically connected and at least two second electrodes are electrically connected.

4. The optical switch according to claim 1, further comprising a plurality of first signal lines and a plurality of second signal lines; wherein
   first electrodes in at least one row are electrically connected to a same first signal line, and second electrodes in at least one column are electrically connected to a same second signal line.

5. The optical switch according to claim 1, wherein the first electrode and the second electrode include light-transmitting electrodes.

6. The optical switch according to claim 2, wherein the micro-fluid is the electrowetting micro-fluid; the electrowetting micro-fluid includes a light-transmitting micro-fluid and a non-light-transmitting micro-fluid that is immiscible with the light-transmitting micro-fluid, and a contact angle of one of the light-transmitting micro-fluid and the non-light-transmitting micro-fluid is capable of being changed when the one of the light-transmitting micro-fluid and the non-light-transmitting micro-fluid is driven by a corresponding driving electrode.

7. The optical switch according to claim 6, wherein the non-light-transmitting micro-fluid includes a light-absorbing micro-fluid.

8. The optical switch according to claim 1, further comprising at least one support portion disposed between the first substrate and the second substrate.

9. A display apparatus, comprising the optical switch according to claim 1.

10. The display apparatus according to claim 9, further comprising at least one grating; wherein
    the optical switch is located at a light exit side of the at least one grating.

11. The display apparatus according to claim 9, further comprising an augmented reality (AR) display screen; wherein
    the optical switch is located at an ambient light incident side of the AR display screen.

* * * * *